United States Patent
Kim et al.

(10) Patent No.: US 10,291,337 B2
(45) Date of Patent: May 14, 2019

(54) METHOD AND DEVICE FOR MEASURING BY USING TERMINAL IN WIRELESS COMMUNICATION SYSTEM

(71) Applicant: LG ELECTRONICS INC., Seoul (KR)

(72) Inventors: Sangwon Kim, Seoul (KR); Youngdae Lee, Seoul (KR); Sunghoon Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/556,466

(22) PCT Filed: Jan. 28, 2016

(86) PCT No.: PCT/KR2016/000916
§ 371 (c)(1),
(2) Date: Sep. 7, 2017

(87) PCT Pub. No.: WO2016/144001
PCT Pub. Date: Sep. 15, 2016

(65) Prior Publication Data
US 2018/0048403 A1 Feb. 15, 2018

Related U.S. Application Data

(60) Provisional application No. 62/131,829, filed on Mar. 11, 2015.

(51) Int. Cl.
*H04B 17/309* (2015.01)
*H04B 17/24* (2015.01)
*H04B 17/318* (2015.01)
*H04W 88/02* (2009.01)

(52) U.S. Cl.
CPC ........... *H04B 17/309* (2015.01); *H04B 17/24* (2015.01); *H04B 17/318* (2015.01); *H04W 88/02* (2013.01)

(58) Field of Classification Search
CPC .... H04B 17/309; H04B 17/318; H04B 17/24; H04W 88/02
See application file for complete search history.

(56) References Cited

U.S. PATENT DOCUMENTS

| | | | |
|---|---|---|---|
| 2013/0315075 A1* | 11/2013 | Tamura | H04W 24/10 370/242 |
| 2013/0336156 A1* | 12/2013 | Wei | H04L 5/001 370/252 |
| 2014/0169201 A1* | 6/2014 | Tamura | H04L 5/0037 370/252 |

OTHER PUBLICATIONS

Ericsson, "PHY-layer Options to Support CSI Measurement and Reporting for LAA", R1-150588, 3GPP TSG RAN WG1 Meeting #80, Athens, Greece, Feb. 9-13, 2015, pp. 1-3.

(Continued)

*Primary Examiner* — Dady Chery
(74) *Attorney, Agent, or Firm* — Birch, Stewart, Kolasch & Birch, LLP

(57) ABSTRACT

Provided are a method of measuring by using a terminal in a wireless communication system, and a device supporting same. The terminal may: measure on the basis of a reference signal; receive a reference signal flag from a network; and derive a new measurement result on the basis on the received reference signal flag. The reference signal flag issues instructions as to whether a reference signal is sent from a target subframe, and the target subframe is a subframe used to derive the new measurement result.

11 Claims, 8 Drawing Sheets

(56) References Cited

OTHER PUBLICATIONS

Huawei et al., "Considerations of Measurement Issues in LAA", R2-150249, 3GPP TSG-RAN WG2 Meeting #89, Athens, Greece, Feb. 9-12, 2015, See pp. 1-5, and Figure 4.
Huawei et al., "RRM/CSI measurement and feedback for unlicensed carrier", R1-150047, 3GPP TSG RAN WG1 Meeting #80, Athens, Greece, Feb. 9-13, 2015, pp. 1-5.
Samsung, "CSI measurement and reporting for LAA", R1-150365, 3GPP TSG RAN WG1 #80, Athens, Greece, Feb. 9-13, 2015, pp. 1-3.

* cited by examiner

METHOD AND DEVICE FOR MEASURING BY USING TERMINAL IN WIRELESS COMMUNICATION SYSTEM

CROSS REFERENCE TO RELATED APPLICATIONS

This application is the National Phase of PCT International Application No. PCT/KR2016/000916, filed on Jan. 28, 2016, which claims priority under 35 U.S.C. 119(e) to U.S. Provisional Application No. 62/131,829, filed on Mar. 11, 2015, all of which are hereby expressly incorporated by reference into the present application.

BACKGROUND OF THE INVENTION

Field of the Invention

The present invention relates to a wireless communication system, and more particularly, to a method for performing measurement, by a UE, and a device supporting the same.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

Recently, with an increase in data traffic usage, methods have been required that sufficiently satisfy the demand on data use from customers without involving large-scale investment in facilities or a huge increase in communication fees. Accordingly, in order to cope with a data explosion, a large number of wireless service carriers adopt one solution of offloading wireless data traffic concentrating on 3G or LTE networks by utilizing a WLAN communication method available in an unlicensed band, such as the ISM bands.

An unlicensed band is characterized in that since wireless service carriers do not need to obtain the exclusive right to use frequencies in this band through an auction process or the like, an elaborately-designed WLAN is capable of handling significant levels of capacity at remarkably low costs in this band, as compared with a network established in a licensed band. However, since large numbers of communication equipment may be used in an unlicensed band without restriction under rules associated with a certain level of adjacent band protection and in-band interference, a communication service using the unlicensed band may not guarantee as high communication quality as a communication service through a licensed band within the exclusive right can provide. In addition, although standardization for interworking HSPA or LTE services as 3GPP technologies with Wi-Fi as an IEEE technology has been in progress since 2002, it is difficult to completely integrate two networks with different network structures and to provide a service in view of handover and guaranteed QoS.

In order to solve these problems, LTE technology in an unlicensed band (LTE on unlicensed spectrum (LTE-U) or U-LTE) has been actively discussed recently.

Meanwhile, a wireless communication system may need to estimate an uplink channel or downlink channel to transmit/receive data, to achieve system synchronization, and to feed back channel information. In a wireless communication system environment, fading occurs by multipath time delay. A process of recovering a transmitted signal by compensating for a signal distortion caused by drastic environmental changes by fading is referred to as channel estimation. Further, it is needed to measure a channel state with respect to a cell to which a user equipment (UE) belongs or another cell. For channel estimation or channel state measurement, channel estimation is generally performed using a reference signal (RS) known between a transmitter and a receiver.

A UE may perform measurement using the following three methods.

1) Reference signal received power (RSRP): RSRP indicates the average received power of all resource elements (REs) carrying CRSs transmitted over the entire band. Here, the UE may measure the average received power of all REs carrying channel state information (CSI) RSs instead of CRSs.

2) Received signal strength indicator (RSSI): RSSI indicates received power measured over the entire band. RSSI includes all of a signal, interference, and thermal noise.

3) Reference symbol received quality (RSRQ): RSRQ indicates a channel quality indicator (CQI) and may be determined as RSRP/RSSI depending on a bandwidth or a sub-band. That is, RSRQ refers to signal-to-interference-plus-noise-ratio (SINR). Since RSRP does not provide sufficient mobility information, RSRQ may be used instead of RSRP in a handover or cell reselection process.

RSRQ may be calculated by RSSI/RSSP. Alternatively, RSRQ may be calculated by N*RSSI/RSSP. Here, N may be a parameter (for example, the number of PRBs) or a function associated with a bandwidth in which RSSI is measured.

SUMMARY OF THE INVENTION

If a UE performs measurement on a subframe in which no reference signal is transmitted and calculates a measurement result based on thus measurement, an inaccurate measurement result may be obtained. This may be a problem particularly in a cell on an unlicensed frequency, which is allowed to transmit a reference signal only during a channel occupation time. Accordingly, in order to solve these problems, the present invention proposes a method in which a UE performs measurement and induces a new measurement result based on a reference signal flag, and a device supporting the same.

According to one embodiment, there is provided a method for performing measurement by a UE in a wireless communication system. The method performed by the UE may include: performing measurement based on a reference signal; receiving a reference signal flag from a network after performing the measurement; and inducing a new measurement result based on the received reference signal flag. The reference signal flag may indicate whether the reference signal is transmitted in a target subframe, and the target subframe may be a subframe used to induce the new measurement result.

The method performed by the UE may further include storing a result of the performed measurement. The stored result may be any one of reference signal received power (RSRP), reference symbol received quality (RSRQ), and a received signal strength indicator (RSSI).

The method performed by the UE may further include assessing the induced new measurement result and determining to report the induced new measurement result to the network.

The measurement may be performed in all subframes.

The measurement may be performed only in a subframe in which the reference signal is transmitted.

The measurement may be any one of radio resource management (RRM) measurement, radio link monitoring (RLM) measurement, and channel state information (CSI) measurement.

The new measurement result may be induced using a measurement result on a subframe in which the reference signal is transmitted among the target subframes.

The target subframe may be a subframe indicated by the reference signal flag.

The target subframe may be a subframe previous to a subframe in which the reference signal flag is received. The number of previous subframes may be singular. The number of previous subframes may be plural. The number of previous subframes may be signaled through the reference signal flag.

The reference signal and the reference signal flag may be received on an unlicensed frequency.

According to another embodiment, there is provided a UE for performing measurement in a wireless communication system. The UE may include: a memory; a transceiver; and a processor to connect the memory and the transceiver, wherein the processor may be configured to: perform measurement based on a reference signal; control the transceiver to receive a reference signal flag from a network; and induce a new measurement result based on the received reference signal flag. The reference signal flag may indicate whether the reference signal is transmitted in a target subframe, and the target subframe may be a subframe used to induce the new measurement result.

A UE may induce an accurate measurement result based on a measurement result on a subframe in which a reference signal is transmitted.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
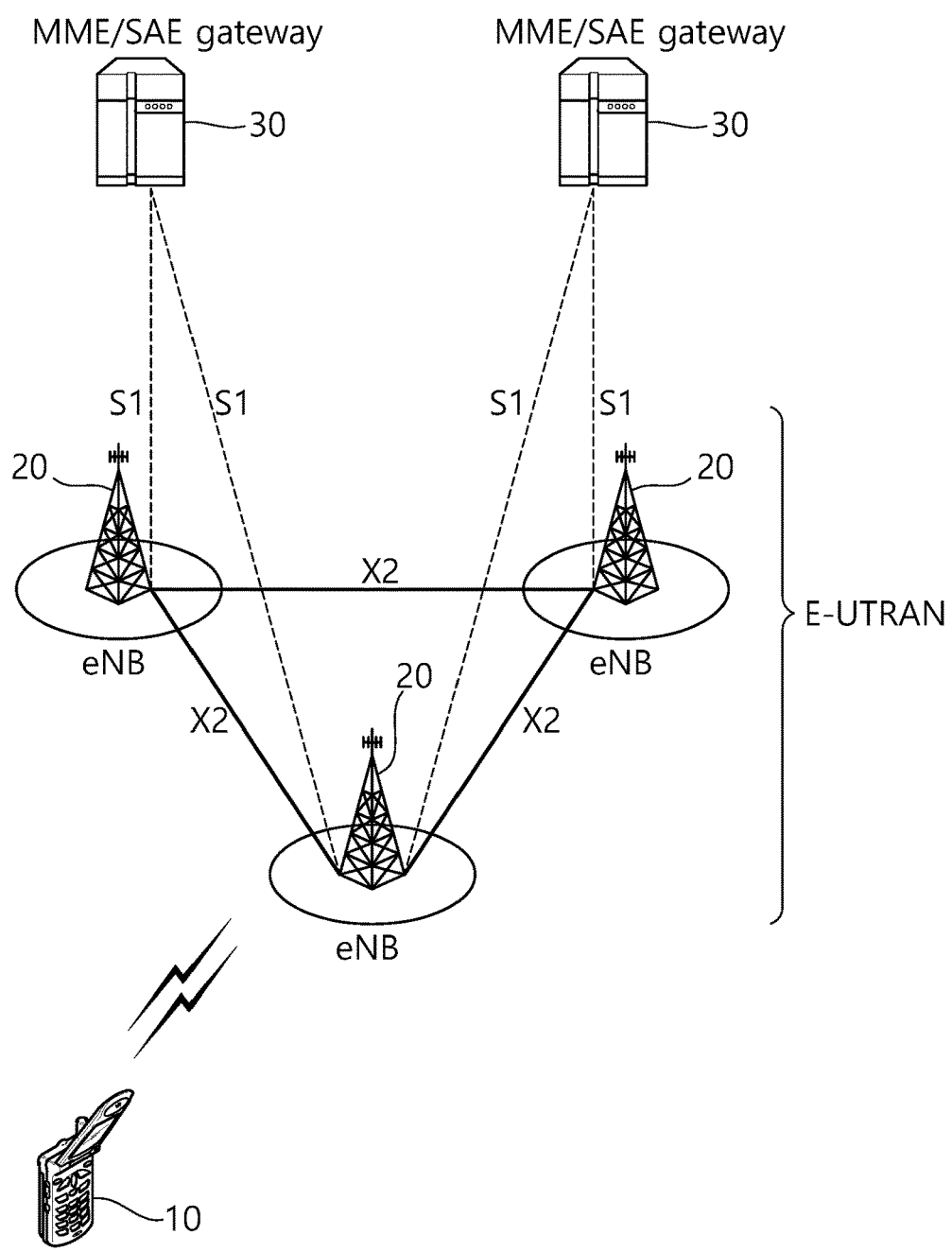
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
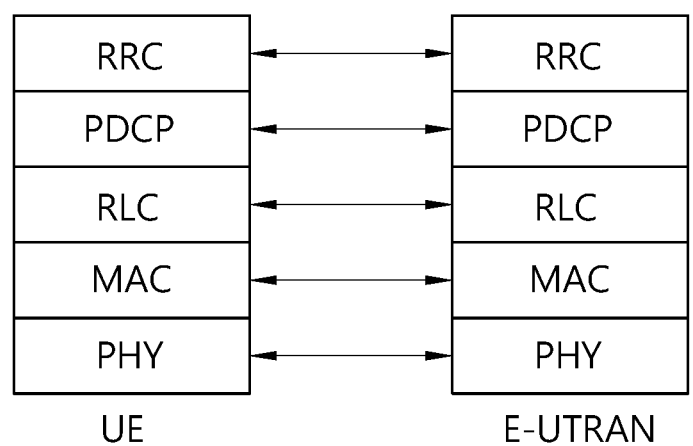
FIG. 2 shows a control plane of a radio interface protocol of an LTE system.
Figure 3:
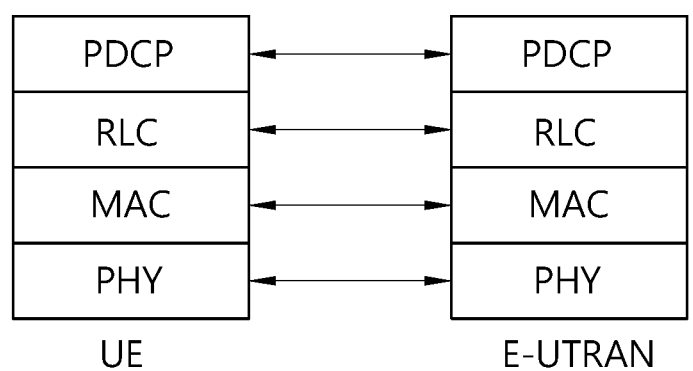
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
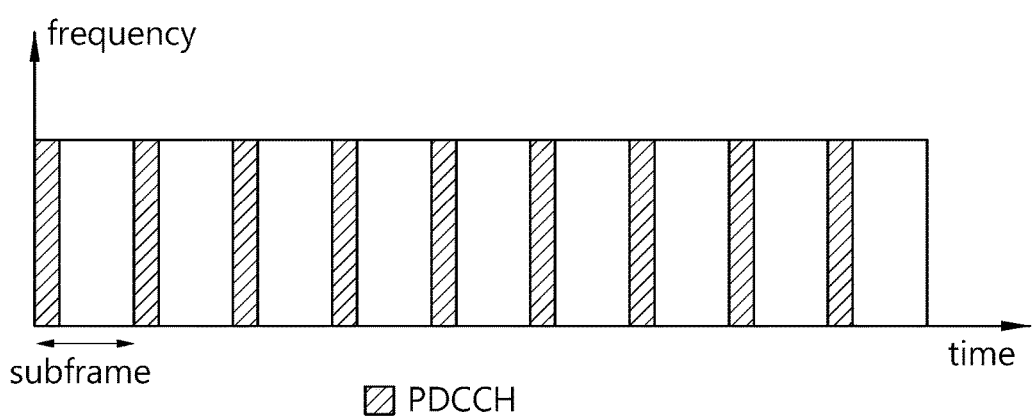
FIG. 4 shows an example of a physical channel structure.
Figure 5:
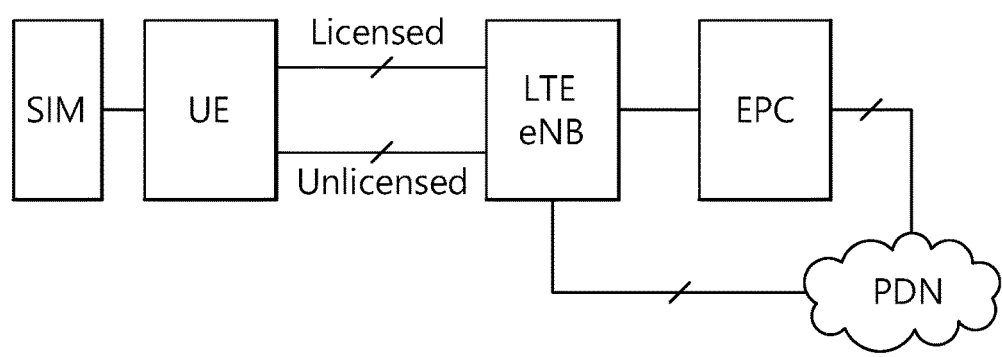
FIG. 5 illustrates a network configuration in which licensed and unlicensed bands are integrated.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

Hereinafter, a reference signal (RS) is described.

In the wireless communication system, since data/signal is transmitted through a radio channel, the data/signal may be distorted on the radio during transmission. In order to normally receive the distorted signal, it is preferable that distortion of the received signal should be compensated using channel information. At this time, a reference signal (RS) known by both a transmitter and a receiver may be used by the transmitter and/or the receiver to detect channel information. The reference signal may be referred to as a pilot signal. When the transmitter transmits and receives data by using multiple antennas, it is preferable that a channel state between each transmitting antenna and each receiving antenna should be detected, whereby the receiver may receive the data exactly. At this time, it is preferable that each transmitting antenna of the transmitter has its individual reference signal to detect the channel state.

Downlink reference signals include a common reference signal (CRS) shared by all UEs in one cell, a UE-specific reference signal (UE-specific RS) only for a specific UE, a multimedia broadcast and multicast single frequency network (MBSFN) reference signal, a positioning reference signal (PRS), and a channel state information reference signal (CSI RS).

A transmitter may provide information for demodulation and channel measurement to a receiver using reference signals. The receiver (for example, a UE) may measure a channel state using a CRS and may feed an indicator relating to channel quality, such as a channel quality indicator (CQI), a precoding matrix index (PMI) and/or a rank indicator (RI), back to the transmitter (for example, a BS) according to the measured channel state. In the present specification, a CRS may be a cell-specific reference signal (cell-specific RS). The CRS is transmitted via all downlink subframes within a cell supporting PDSCH transmission. The CRS may be transmitted through antenna ports 0 to 3 and may be defined only for $\Delta f = 15$ kHz. The CRS is disclosed in Section 6.10.1 of 3GPP TS 36.211 V10.1.0 (2011-03).

Meanwhile, a reference signal relating to the feedback of channel state information (CSI) may be defined as a CSI-RS. The CSI-RS may be relatively sparsely deployed in a frequency domain or time domain, and may be punctured in a data region of a normal subframe or an MBSFN subframe. If necessary, a CQI, a PMI, and an RI may be reported from a UE through CSI estimation.

A UE-specific RS may be transmitted to UEs through resource elements when the demodulation of data on a PDSCH is needed. A UE may receive the presence of a UE-specific RS through upper-layer signaling. The UE-specific RS is valid only when mapped to a corresponding PDSCH signal.

An MBSFN RS may be transmitted via a subframe allocated for MBSFN transmission. A PRS may be used for location estimation of a UE. A CSI RS is used for channel estimation for a PDSCH of a LTE-A UE.

Generally, an RS is transmitted as a sequence. Any sequence may be used as an RS sequence without particular restrictions. The RS sequence may be a phase shift keying (PSK)-based computer generated sequence. Examples of PSK include binary phase shift keying (BPSK), quadrature phase shift keying (QPSK), or the like. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, or the like. Alternatively, the RS sequence may be a pseudo-random (PN) sequence. Examples of the PN sequence include an m-sequence, a computer generated sequence, a Gold sequence, a Kasami sequence, or the like. In addition, the RS sequence may be a cyclically shifted sequence.

Hereinafter, an LTE service in an unlicensed band is described.

A licensed band guarantees higher reliability and communication quality than those of an unlicensed band as a shared resource, since the exclusive right to use the licensed band is assigned to a single service provider. However, enormous costs are expended in securing a licensed band through spectrum auctions or the like, and securing an additional frequency is absolutely needed in order to deal with the current demand for data. As a solution, an LTE service in an unlicensed band (LTE on unlicensed spectrum (LTE-U)) has been proposed.

LTE-U can provide improved mobility, security, and communication quality by extending advantages of LTE to an unlicensed band and can increase data throughput due to higher frequency efficiency of LTE than that of existing radio access technologies. Further, referring to FIG. 6, which illustrates a network in which licensed and unlicensed bands are integrated, LTE-U is fairly advantageous in terms of investment and management costs in that licensed and unlicensed bands can be managed as a single integrated network without significantly alterations to an existing core network.

However, since transmission output is generally restricted in an unlicensed band, an unlicensed band mostly provides smaller coverage than a licensed band that can be exclusively used, even though the unlicensed band is the same frequency band as the licensed band. Further, to comply with regulations set to minimize interference with other communication modes or communication devices of other service providers also present in the same frequency band, uniform levels of services may not be guaranteed in a certain area. Further, when service coverage is established based on an existing cellular mode using an unlicensed band, reliability in the transmission of an important signal, which needs to be transmitted through a control channel or the like, may not be sufficiently ensured. To avoid these problems and to maximally bring advantages of an unlicensed band, it is proposed to use an unlicensed band for CA in combination with an LTE service in a licensed band or as a supplement downlink (SDL).

Signal transmission, which needs to have guaranteed reliability to provide LTE services, such as network management, radio resource allocation, UE mobility control, and the like, is achieved through LTE in a licensed band serving as a primary component carrier (PCC). However, LTE in an unlicensed band may accommodate both a scenario for supporting both an uplink and a downlink and a scenario for supporting a downlink only, but always serves as a secondary component carrier (SCC) and operates in a manner for improving performance, such as cell capacity and average data rate per user, by supplementing an LTE service on a PCC. In a scenario where an LTE service in an unlicensed band is provided via integration with an LTE service in a licensed band, cross-carrier scheduling technology, security and QoS guaranteeing technology, or the like, which can be achieved in CA between licensed bands, may be applied and the performance of an LTE service in an unlicensed band, which is relatively vulnerable to interference, may be supplemented through inter-cell interference coordination (ICIC).

A key issue of LTE-U services is a fairness problem caused by coexistence with existing radio access technologies in an unlicensed band, especially WLAN technology. Since LTE and WLAN technologies are fundamentally different in PHY/MAC architecture, if these technologies coexist in a single band, a fairness problem may seriously arise in that services are concentrated only in LTE. That is, LTE can share a frequency using an OFDMA scheme, whereas a WLAN employs CSMA/CA and thus cannot share a channel but waits until the channel is idle. Thus, it is highly likely that communication is performed mainly via LTE. To solve this problem, a Listen Before Talk (LBT) mechanism for checking the presence of other communication radio waves that may cause interference in a corresponding band may be applied.

A cell on an unlicensed frequency is allowed to transmit an RS only during a channel occupation time. However, since a UE cannot know the channel occupation time, the UE cannot know when the RS is transmitted. Therefore, the UE does not know when to attempt to perform radio resource management (RRM) measurement, radio link monitoring (RLM) measurement or channel state information (CSI) measurement on the unlicensed frequency. Accordingly, in order to solve these problems, the present invention proposes a method for performing measurement, by a UE, using an RS, and a device supporting the same.

Although it is assumed that measurement is performed a cell on an unlicensed frequency for the clarity of description, the present invention is not limited thereto. The present invention may also be applied when measurement is performed on a cell on a licensed frequency.

Figure 6:
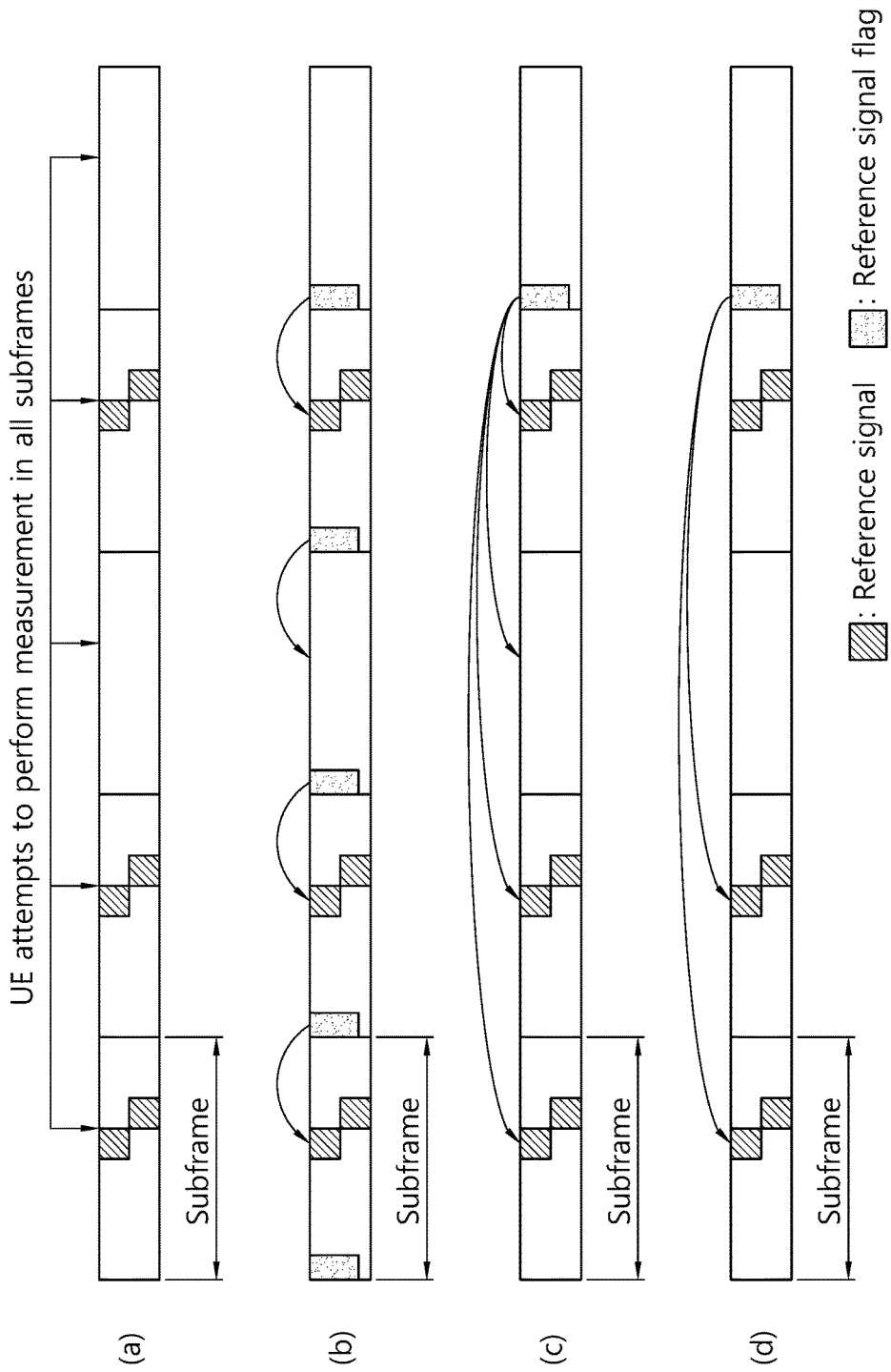
FIG. 6 illustrates an example of a method in which a UE performs measurement using a reference signal flag according to an embodiment of the present invention.

FIG. 6 illustrates an example of a method in which a UE performs measurement using an RS flag according to an embodiment of the present invention.

Step 1: A UE may measure an RS in a subframe and may store a measurement result. The subframe may include all subframes. The measurement may be any one of radio resource management (RRM) measurement, radio link monitoring (RLM) measurement, and channel state information (CSI) measurement. The measurement result may be any one of reference signal received power (RSRP), reference symbol received quality (RSRQ), and a received signal strength indicator (RSSI).

The UE may assume that an RS is transmitted in every subframe. If possible, when no RS is detected in a subframe, the UE may not perform measurement on the subframe.

Referring to FIG. 6(a), although it is assumed that the UE performs measurement on all subframes regardless of whether an RS is transmitted in the subframes, the present invention is not limited thereto. When the UE detects that no RS is transmitted in a subframe, the UE may not perform measurement on the subframe.

Step 2: The UE may receive an RS flag from a network. The RS flag may indicate whether an RS is transmitted in a target subframe.

Referring to FIG. 6(b), the target subframe may be the last subframe received by the UE before the RS flag is received. That is, the target subframe may be one subframe before a subframe in which the RS flag is received. It is assumed in the embodiment of FIG. 6(b) that the RS flag is transmitted in all subframes, but the present invention is not limited thereto.

Referring to FIG. 6(c), the target subframe may be last N subframes received by the UE before the RS flag is received. That is, the target subframe may be a plurality of subframes before a subframe in which the RS flag is received. In this case, the number of subframes represented by N may be signaled through the RS flag. It is assumed in the embodiment of FIG. 6(c) that N is 4.

Referring to FIG. 6(d), the target subframe may be explicitly indicated by the RS flag. It is assumed in the embodiment of FIG. 6(d) that the RS flag indicates first and second subframes.

Step 3: The UE may induce a measurement result based on the RS flag and may assess the induced measurement result.

The UE may determine whether an RS is transmitted in a subframe to be measured by the UE by receiving the RS flag. Further, the UE may induce a new measurement result by collecting a measurement result on a subframe in which an RS is transmitted. In addition, the UE may assess the new measurement result in order to determine whether to report the induced new measurement result.

Figure 7:
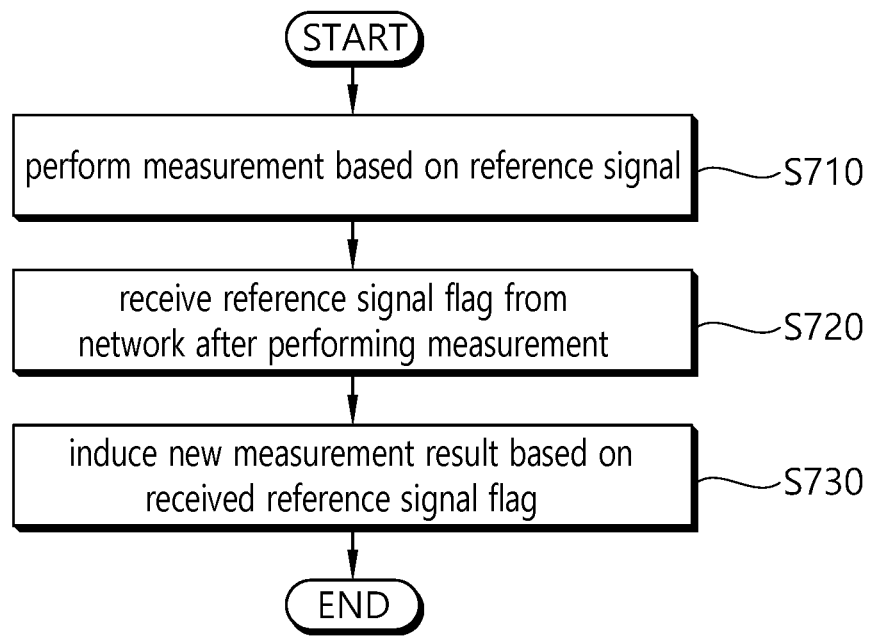
FIG. 7 is a block diagram illustrating a method in which a UE performs measurement according to an embodiment of the present invention.

FIG. 7 is a block diagram illustrating a method in which a UE performs measurement according to an embodiment of the present invention.

The UE may perform measurement based on an RS (S710).

The measurement may be performed on all subframes or only on a subframe in which the RS is transmitted. The measurement may be any one of radio resource management (RRM) measurement, radio link monitoring (RLM) measurement, and channel state information (CSI) measurement.

The UE may receive an RS flag from a network (S720).

The RS and the RS flag may be received on an unlicensed frequency. Further, the RS and the RS flag may also be received on a licensed frequency. The RS flag may be received in all subframes or only in a specified subframe. A target subframe refers to a subframe used to induce a new measurement result and may be explicitly or implicitly indicated by the RS flag. The RS flag may indicate whether an RS is transmitted in the target subframe. The target subframe may be a subframe previous to a subframe in which the RS flag is received, and the number of previous subframes may be one or greater and may be signaled through the RS flag.

The UE may induce a new measurement result based on the received RS flag (S730).

The new measurement result may be induced using a measurement result on the subframe in which the RS is transmitted among the target subframes.

The UE may store a result of the performed measurement, and the result of the measurement may be any one of reference signal received power (RSRP), reference symbol received quality (RSRQ), and a received signal strength indicator (RSSI). The UE may assess the induced new measurement result and may determine to report the induced new measurement result to the network.

Figure 8:
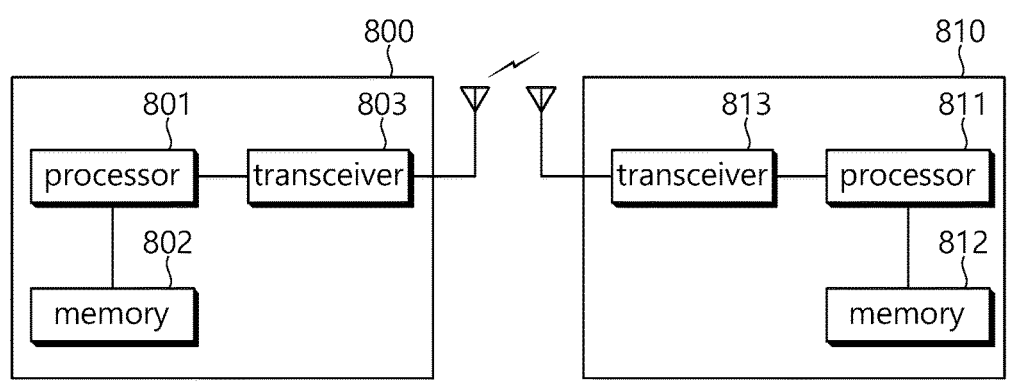
FIG. 8 is a block diagram illustrating a wireless communication system according to the embodiment of the present invention.

FIG. 8 is a block diagram illustrating a wireless communication system according to the embodiment of the present invention.

A BS 800 includes a processor 801, a memory 802 and a transceiver 803. The memory 802 is connected to the processor 801, and stores various information for driving the processor 801. The transceiver 803 is connected to the processor 801, and transmits and/or receives radio signals. The processor 801 implements proposed functions, processes and/or methods. In the above embodiment, an operation of the base station may be implemented by the processor 801.

A UE 810 includes a processor 811, a memory 812 and a transceiver 813. The memory 812 is connected to the processor 811, and stores various information for driving the processor 811. The transceiver 813 is connected to the processor 811, and transmits and/or receives radio signals. The processor 811 implements proposed functions, processes and/or methods. In the above embodiment, an operation of the UE may be implemented by the processor 811.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for performing measurement by a user equipment (UE) in a wireless communication system, the method comprising:
performing measurement on a plurality of subframes, based on a reference signal;
after performing the measurement, receiving a reference signal flag informing the UE of at least one target subframe, on a first subframe from a network,
wherein the target subframe is N subframes previous to the first subframe on which the reference signal flag is received, and
wherein the N is a positive integer; and
deriving a new measurement result, based on a result of the measurement on the target subframe among a result of the measurement on the plurality of subframes.

2. The method of claim 1, further comprising:
storing a result of the performed measurement on the plurality of subframes.

3. The method of claim 2, wherein the stored result is at least one of reference signal received power (RSRP), reference symbol received quality (RSRQ), and/or a received signal strength indicator (RSSI).

4. The method of claim 1, further comprising:
determining whether or not to report the derived new measurement result to the network, by evaluating the derived new measurement result.

5. The method of claim 1, wherein the plurality of subframes are all subframes.

6. The method of claim 1, wherein the plurality of subframes are subframes in which the reference signal is transmitted.

7. The method of claim 1, wherein the measurement is at least one of radio resource management (RRM) measurement, radio link monitoring (RLM) measurement, and/or channel state information (CSI) measurement.

8. The method of claim 1, wherein the new measurement result is derived by collecting a result of the measurement on at least one subframe in which the reference signal is transmitted among the target subframe.

9. The method of claim 1, wherein the reference signal flag includes a value of the N.

10. The method of claim 1, wherein the reference signal and the reference signal flag are received on an unlicensed frequency.

11. A user equipment (UE) for performing measurement in a wireless communication system, the UE comprising:
- a memory;
- a transceiver; and
- a processor connected to the memory and the transceiver, wherein the processor is configured to:
    - perform measurement on a plurality of subframes, based on a reference signal,
    - after performing the measurement, control the transceiver to receive a reference signal flag informing the UE of at least one target subframe, on a first subframe from a network,
    - wherein the target subframe is N subframes previous to the first subframe on which the reference signal flag is received, and
    - wherein the N is a positive integer, and
    - derive a new measurement result, based on a result of the measurement on the target subframe among a result of the measurement on the plurality of subframes.

\* \* \* \* \*